Aug. 7, 1956 D. W. BAREIS 2,758,023
METHOD OF PURIFYING LIQUID FUELS OF NUCLEAR REACTORS
Filed April 24, 1953
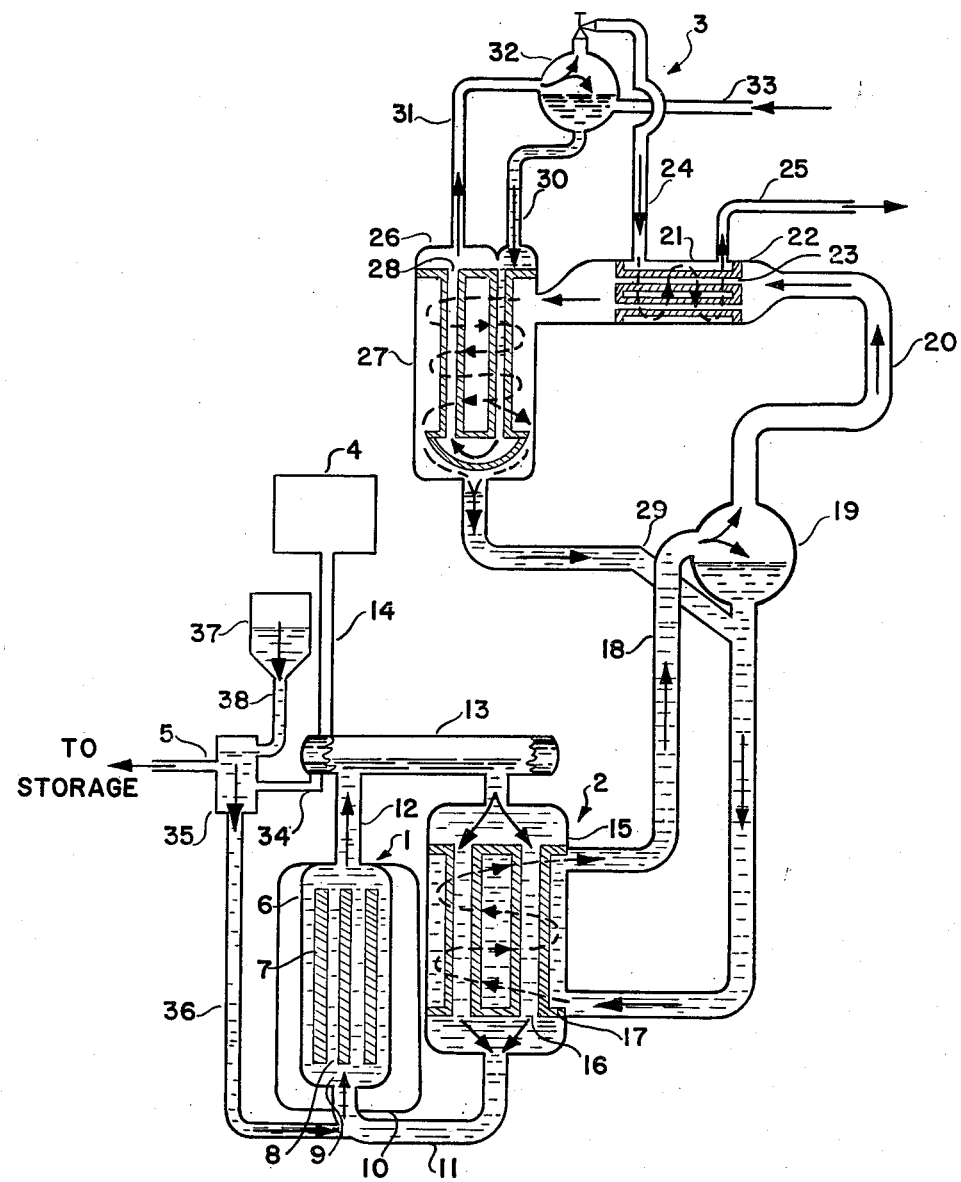
INVENTOR.
DAVID W. BAREIS United States Patent Office 2,758,023
Patented Aug. 7, 1956

2,758,023
METHOD OF PURIFYING LIQUID FUELS OF NUCLEAR REACTORS

David W. Bareis, Brookhaven, N. Y., assignor to the United States of America as represented by the United States Atomic Energy Commission Application April 24, 1953, Serial No. 350,910

8 Claims. (Cl. 75—84.1)

This invention relates to a method of treating certain types of liquid metals or alloys that are useful as fuels in nuclear reactors or atomic piles, to remove fission products therefrom. The fuel may be a solution of uranium in a liquid metal or a uniform suspension of a metallic uranium compound in a liquid metal carrier. Fission causes the uranium to undergo nuclear reaction with neutrons to release further neutrons, heat, and various elements into which the uranium atoms are split. The removal of these fission products or maintaining them at a steady, low concentration in the nuclear fuel is an important problem because they have a high neutron cross section and therefore cut down the efficacy of the fuel in sustaining the chain reaction as well as in producing a surplus of neutrons which may be used for various purposes. That is, the fission products waste neutrons and are considered poisons from the point of view of reactor operation.

In recent years there has been considerable interest in reactors which utilize such molten metal or slurry type fuels in view of their advantages over fuels in the form of a solid slug or rod. With the latter, warping or other mechanical damage may occur as a result of exposure to the conditions in a pile. This may necessitate removal of the rod before complete burn-up of the fissionable material contained therein, followed by chemical processing to remove fission products and to recover the residual fissionable material, and refabrication into a rod. With the liquid form, such warping and mechanical damage cannot occur. Cheaper and more efficient processing to remove fission products is made possible since it is unnecessary to disassemble the pile periodically and remove the solid rods therefrom for this purpose. The several metal fabricating operations required in preparing solid fuel units are eliminated, such as casting, cutting and machining to size, cladding with corrosion resistant materials, inspection for good bonding and the like.

In general, the objects of the invention are: to provide an economical and efficient method of separating fission products from a liquid nuclear fuel; to provide a method in which it is possible to achieve complete burn-up of the fissionable material placed in the reactor and to avoid shutdowns prior thereto for the purpose of purification; to integrate the decontamination step with the operation of the reactor so that decontamination may be carried out while the latter is running and without interfering with its normal operation; to avoid high losses of fuel during decontamination; to provide such a method which may be practiced continuously or batchwise as desired; and to recover the fission products in a highly concentrated form. Other objects will become apparent in the description which follows.

These objects are accomplished, in general, by means of a liquid-liquid extraction method which is normally carried on outside the reactor proper and concurrently with its operation. It has now been found that when the liquid fuel comprises uranium or plutonium and if desired thorium, and at least one low-melting heavy metal, the fission products may be extracted from the fuel selectively and nearly quantitatively by contacting the molten fuel containing them with an oxygen-free molten salt of a metal selected from the group of the alkali metal and alkaline earth metals excluding beryllium. The low-melting heavy metals are shown as a group consisting of Zn, Cd, Hg, Al, Ga, In, Tl, Ge, Sn, Pb, Sb, Bi, Po in the Periodic Chart of the Elements in Deming's "General Chemistry," fifth edition, and the alkali and alkaline earth metals in Groups IA consisting of Li, Na, K, Rb, Cs and IIA Be, Mg, Ca, Sr, Ba, Ra of the same. Suitable fuels are, for example, finely divided $USn_3$ uniformly suspended in a molten metallic medium such as bismuth, lead, lead-bismuth alloys, tin-bismuth alloys, bismuth-lead-tin alloys and aluminum, or a solution of uranium in a low-melting heavy metal such as bismuth, a mixture of lead and bismuth or the like. A fertile material such as $ThBi_3$ may be included in the fuel. Preferably the low-melting heavy metal has a low neutron cross section. Oxygen should be excluded from the anions of the salts employed as the extractant, because oxygen-containing anions react with the fuel at the elevated temperatures used. For the same reason water should be excluded from the extraction process. Hence the process is carried out in an inert gas atmosphere or under vacuum. The salts used may be halides, e. g., the bromides, iodides, chlorides and fluorides. Mixtures of the halides, such as of the chlorides, are useful, particularly eutectic mixtures when relatively low melting points are desired. For the particular reactor described herein, the chlorides and especially the eutectic mixture of KCl and LiCl, M. P. about 350° C., are preferred. Extraction is carried out at elevated temperatures at which both the salt and the low-melting metal of the fuel are molten. The temperature of extraction will vary depending on reactor conditions since the hot fuel contacts the salt and therefore affects the temperature of the extraction system as a whole. The selection of the salt will therefore depend on conditions in the reactor for the salt should be molten at the extraction temperature. For the pile described herein a useful extraction temperature range is about 350°–550° C. The purification method may be carried out continuously or intermittently. In the former instance, the level of fission products permitted to remain in the fuel can be controlled by regulating the rate at which the fuel flows into the extraction unit; and in the latter instance by regulating the fraction per batch of the total fuel contacted and the frequency of the contacting. The fuel may flow into and out of the extraction system by gravity or pumping means may be used. The salt may be held in a vessel through which the fuel is passed; or it may be caused to flow countercurrent to the latter.

As conducive to a clearer understanding of the invention, several terms used herein are explained.

The percent poisoning due to fission products is the percent of the total neutrons produced that is captured by the fission products.

The critical mass is that quantity of uranium which is just sufficient to sustain a chain reaction, for a particular pile design.

The burn-up time is the time required for the initial amount of uranium placed in the reactor to be exhausted as fuel, by fission.

The minimum doubling time is the amount of time required (discounting the effect of fission product poisons) to breed an excess or profit of fissionable uranium equal to the initial starting quantity, which excess is over and above that needed to sustain the chain reaction at the given power level and to regenerate the $U^{233}$ needed for the latter purpose.

The fission products are the various elements produced in the splitting of uranium atoms. Several of them have a high neutron cross section. The rare earth metals of the lanthanum series and yttrium account for nearly half of the poisoning effect and are of major concern in purification. The next largest contributor is the isotope $Xe^{135}$, which is removed by a degassing step. The balance is caused by various other elements to a smaller extent, such as Rb, Cs, Ru, Rh, Pd, Sr, Ba, Zr, Cb, Ag, Te.

The invention will be described in relation to a breeder reactor utilizing as fuel a solution of uranium 233 in molten bismuth, and with reference to the drawing which is a flow diagram of such a unit. In order not to exceed the solubility limits of uranium in bismuth, uranium that is pure $U^{233}$ or $U^{235}$ or is enriched therein should be used.

As shown in the drawing, the system which is surrounded by shielding (not shown) consists essentially of the reactor proper 1, a first heat exchanger unit 2 for cooling the liquid fuel by means of mercury, a second heat exchanger 3 for abstracting the heat from the mercury and for providing steam for use in a power plant, a vacuum system 4 for removing gaseous fission products from the reactor, and a salt-contacting unit 5 for purifying the fuel to remove non-gaseous fission products therefrom, in which latter unit the process of this invention is carried out. The reactor 1 comprises a container 6 in which are placed beryllium rods 7 spaced from one another to provide passages 8 through which the fuel 9 continuously circulates. The reactor 1 is surrounded by a breeder container 10 containing Th in a suitable form such as $ThF_4$. An inlet conduit 11 connects the reactor 1 with the heat exchanger unit 2. An outlet conduit 12 from the reactor and the other end of the heat exchanger unit 2 are connected to a header 13 which is in turn connected through line 14 to the vacuum system 4. The heat exchanger unit 2 comprises a shell 15 and tubes 16 which are sealed from the shell by tube-sheet 17. The tubes 16 provide passageways for the fuel which circulates in heat transfer relation and out of contact with the mercury circulating in the shell. The unit 2 is provided with a mercury conducting conduit 18 connected between the shell 15 and the mercury vapor flash chamber 19. The flash chamber is connected to an outlet conduit 20 for mercury vapor which in turn is connected to a heat exchanger 21, provided with a shell 22 and tubes 23 through which the mercury passes. The shell 22 is connected to a line 24 through which saturated steam enters and a line 25 through which superheated steam leaves. The heat exchanger 21 is connected to a similar unit 26 provided with a shell 27 and tubes 28 through which water passes in heat transfer relation with mercury entering the shell 27 of exchanger 26 from tubes 23. Condensed mercury is returned to the heat exchanger 2 through conduit 29. Water is introduced into exchanger 26 by means of line 30 and a mixture of steam and water leaves the tubes 28 through line 31. This mixture separates in a drum 32 to which water may be added through line 33 and which supplies steam to line 24. The salt-contacting unit 5 comprises a line 34 connected between the header 13 and the salt-contacting chamber 35. A conduit 36 is provided between the chamber 35 and the inlet conduit 11 to the reactor, for returning the purified fuel to the reactor. A salt melting unit 37 is provided for melting the salt prior to use in the contacting chamber 35 and may be fed thereto through line 38. The chamber 35 is kept under vacuum and contaminated salt is withdrawn to storage. The fission products may subsequently be separated from the salt for example by electrolysis, distillation, inorganic ion exchange or other methods.

The operation of the system as a whole will be apparent at least in part from the foregoing description. In the reactor proper 1, a self-sustaining nuclear chain reaction is maintained in which atoms of $U^{235}$ or $U^{233}$, depending on the fuel used, undergo reaction with neutrons to produce further neutrons, heat and fission products. The beryllium rods moderate the energies of the neutrons produced by fission, to bring them into the thermal range of energies. The nuclear reaction is accompanied by the production of heat and the bismuth component of the circulating molten fuel acts as a coolant to take up and carry away the heat so produced. The hot fuel flows by thermal convection to the header 13 and through the tube pass of the heat exchanger unit 2 in which it is cooled by the mercury in the shell. The fuel at the lower temperature is then returned to the reactor where it again undergoes heating and the cycle is repeated. Hg vapor forms in line 18 and a mixture of hot mercury liquid and vapor flows through line 18 into the flash chamber 19 where separation occurs, the vapor passing into the heat exchanger 21. There it is brought into heat transfer relation with saturated steam which becomes heated to a higher temperature and is taken off for use in a power plant. The mercury then gives up more of its heat to incoming water in the exchanger 26, condenses, and flows back to the heat exchanger unit 2, thus completing the mercury cycle. The gaseous fission products are continuously removed by means of the vacuum system 4. The non-gaseous fission products are removed by withdrawing a small side-stream of the molten fuel through conduit 34 and introducing it into a body of a salt immiscible therewith such as an eutectic mixture of KCl and LiCl. Suitably the fuel is sprayed into the molten salt. It flows through the salt as droplets and being heavier coalesces at the bottom of the salt-contacting chamber. The separation of the fission products from the fuel is very rapid and sharp. The decontaminated fuel then flows by gravity through return line 36 into the inlet conduit 11 to the reactor 1.

Analytical results have shown that in a single batch extraction using equal volumes of extractant and fuel, more than 90% of the rare earth metal fission products is removed at 450° C.

The parameters of the reactor will depend to a large extent on the atomic ratio of beryllium to bismuth, $$\frac{N_{Be}}{N_{Bi}}$$

and also on the atomic concentration of uranium in bismuth $$\frac{N_{U^{233}}}{N_{Bi}}$$

the selection of which depends to some extent on the former ratio. For a specific case, the parameters will be the following:

| | |
|---|---|
| Distance between centers of 2-inch Be rods (in.) | 3.0 |
| $\frac{N_{Be}}{N_{Bi}}$ | 2.87 |
| $\frac{N_{U^{233}} \times 10^6}{N_{Bi}}$ | 598 |
| Reactor diameter (ft.) | 5.53 |
| Reactor height (ft.) | 5.11 |
| Critical mass of $U^{233}$ (kg.) | 13.9 |
| Total mass of $U^{233}$ (kg.) | 125.6 |
| Total weight of Bi (tons) | 188.6 |
| Power (megawatts) | 451 |
| Specific Power $\frac{(kw)}{(Total\ kg.\ U)}$ | 3590 |
| Burn-up time (days) | 279 |
| Minimum doubling time (days) | 1550 |

For the specific case given there is approximately a 170° C. temperature rise in the bismuth across the reactor with a corresponding pressure differential across it of 0.43 lb. per square inch. The fuel entering the reactor in inlet conduit 11 is at about 340° C. and the fuel leaving the reactor and entering the heat exchanger unit 2 is at about 510° C. There are about 5.7 fuel cycles per minute. Heat exchange criteria are selected so that the mercury leaving the unit 2 through conduit 18 is at about 470° C., and is returned to unit 2 through conduit 29 at about 300° C.; the steam generated in shell 22 is at 125 pounds per square inch gauge and 500° F. and the mercury vapor entering the tubes is at 4 pounds per square inch absolute. The extraction step is conveniently carried out at about 450° C. It is economical to recycle the salt used in the extraction.

The following shows the saving in fissionable material that may be obtained by means of the present invention for the 451,000 kilowatt pile with 378,000 pounds of bismuth wherein $$\frac{N_{U^{233}} \times 10^6}{N_{Bi}}$$

equals 598. If 37,800 pounds or 10% of the bismuth is treated each day, the rare earth poisoning can be reduced to .36% using 967 pounds of fused salt. Of the 276 pounds of uranium in the whole fuel system, .001 pound is lost by solution in the salt. During this period (1 day) .178 pound of excess uranium is produced (doubling time of 1550 days). The loss by solution in the salt is .54% of the excess uranium produced. With no processing .099 pound of excess uranium would be lost to production. The loss with processing from the remaining rare earths is only .004 pound excess uranium. The net saving by fuel processing with salt is .094 pound of excess uranium.

The invention may be used in conjunction with other reactors in which the conditions are varied from the specific case described above. For example, the liquid metal fuel compositions may be subjected to neutron irradiation in a reactor such as that described and claimed in U. S. Patent No. 2,708,656 of Fermi and Szilard. Also, the reactor may be a fast reactor instead of thermal and in this instance the moderator will not be used. Other fissile or fertile elements contained in the fuel may be $Pu^{239}$, $Th^{232}$, $U^{238}$. If a moderator is used, graphite can be substituted for the beryllium. Instead of thermal convection, pumps may be used to move the fuel. Other metals or coolants may be employed in place of mercury, such as sodium. Other forms and arrangements of heat exchangers may be employed. The important variables of the beryllium-bismuth ratio and the uranium-bismuth ratio may be changed and therefore the reactor may be operated at different power levels and different temperature conditions such as about 1000° C., average temperature. For construction materials, the container for the reactor and heat exchangers may consist of certain types of steel alloys or molybdenum-clad steel. The container for the breeder material may be nickel when the breeder material is $ThF_4$. The salt-contacting chamber may be made of the same materials as the reactor container.

The above-described reactor is particularly useful as a land based power plant for peacetime, industrial purposes wherein the uranium takes the place of other fuels such as coal. At the same time, it will produce an excess of neutrons over and above that needed to sustain the chain reaction at the indicated power level, which excess may be used for a variety of purposes. For example, the neutrons may be used to produce $Pu^{239}$; or to convert $U^{235}$ to $U^{233}$; or to react with $Th^{232}$ to produce $U^{233}$; or for the production of tritium or other desired valuable materials that may be formed by neutron capture. The fission products may be used for cold sterilization of foods and the like, elimination of static, to induce chain reactions such as polymerizations, etc.

Since many embodiments might be made of the present invention and since many changes might be made in the embodiment described, it is to be understood that the foregoing description is to be interpreted as illustrative only and not in a limiting sense.

I claim:

1. A method of removing the 4f rare earth metals from a liquid metal composition of at least one metal selected from the group consisting of tin, bismuth and lead and having a metal from which nuclear power may be derived as a result of neutron induced fission uniformly distributed therein which comprises contacting said composition with a molten halide salt of at least one metal selected from the group consisting of calcium, magnesium, sodium, potassium, lithium, strontium, barium, radium, rubidium and cesium and separating the salt and metal phases.

2. A method of removing the 4f rare earth metals from a liquid medium containing at least one metal selected from the group consisting of thorium, uranium and plutonium uniformly distributed in at least one molten metal selected from the group consisting of tin, bismuth and lead which comprises bringing said medium into contact with a molten halide salt of at least one metal selected from the group consisting of calcium, magnesium, sodium, potassium, lithium, strontium, barium, radium, rubidium and cesium and separating the salt and metal phases.

3. A method of removing the 4f rare earth metals from a liquid medium containing at least one metal selected from the group consisting of thorium, uranium and plutonium uniformly distributed in at least one molten metal selected from the group consisting of tin, bismuth and lead which comprises bringing said medium into contact with a molten chloride salt of at least one metal selected from the group consisting of calcium, magnesium, sodium, potassium, lithium, strontium, barium, radium, rubidium and cesium and separating the salt and metal phases.

4. A method of removing the 4f rare earth metals from a liquid medium containing at least one metal selected from the group consisting of thorium, uranium and plutonium uniformly distributed in at least one molten metal selected from the group consisting of tin, bismuth and lead which comprises bringing said medium into contact with a molten eutectic mixture of chlorides of metals selected from the group consisting of calcium, magnesium, sodium, potassium, lithium, strontium, barium, radium, rubidium and cesium and separating the salt and metal phases.

5. A method of removing the 4f rare earth metals from a liquid medium containing at least one metal selected from the group consisting of thorium, uranium and plutonium uniformly distributed in at least one molten metal selected from the group consisting of tin, bismuth and lead which comprises bringing said medium into contact with a molten eutectic mixture of potassium chloride and lithium chloride at a temperature in the range from above the melting point of the eutectic to about 550° C. and separating the salt and metal phases.

6. A method of removing the 4f rare earth metals from a liquid medium containing at least one metal selected from the group consisting of thorium, uranium and plutonium uniformly distributed in at least one molten metal selected from the group consisting of tin, bismuth and lead which comprises bringing said medium into contact with a molten eutectic mixture of potassium chloride and lithium chloride selected at a temperature of about 450° C. and separating the salt and metal phases.

7. A method of removing the 4f rare earth metals from a medium containing uranium uniformly distributed in molten bismuth which comprises bringing said medium into contact with at least one molten chloride of a metal selected from the group consisting of calcium, magnesium, sodium, potassium, lithium, strontium, barium, radium, rubidium and cesium and separating the salt and metal phases.

8. A method of removing the 4f rare earth metals from a medium containing uranium uniformly distributed in molten bismuth which comprises bringing said medium into contact with a molten eutectic mixture of potassium chloride and lithium chloride at a temperature of about 450° C. and separating the salt and metal phases.

(References on following page)

References Cited in the file of this patent

UNITED STATES PATENTS 2,029,998  Gilbert ---------------- Feb. 4, 1936

FOREIGN PATENTS 523,303  Great Britain ---------- July 11, 1940

OTHER REFERENCES

A General Account of Development of Methods of Using Atomic Energy, by H. D. Smyth, August 1945. Superintendent of Documents, Washington, D. C.

The Science and Engineering of Nuclear Power, by Clark Goodman, Addison-Wesley Press, Cambridge, Mass., 1947. Pages 285–289, 303, 305–309, 365–369, 376, 377. (In Scientific Library.)